United States Patent Office 3,565,989
Patented Feb. 23, 1971

3,565,989
METHOD FOR PREVENTING FLACHERIE-LIKE DISEASE OF SILKWORMS
Reijiro Kodama, Takezi Hasegawa, and Katsumi Morishima, Toyonaka, and Yoshiharu Tsubota, Kobe, Japan, assignors to Takeda Chemical Industries, Ltd., Osaka, Japan
No Drawing. Continuation-in-part of application Ser. No. 344,823, Feb. 14, 1964. This application Mar. 6, 1967, Ser. No. 620,637
Claims priority, application Japan, Feb. 15, 1963, 38/7,914
Int. Cl. A61k 21/00
U.S. Cl. 424—181                                   5 Claims

ABSTRACT OF THE DISCLOSURE

The inhibitory action of certain antibiotics such as dihydrostreptomycin, zygomycin $A_1$, neomycin B, kanamycin, leucomycin, erythromycin, pikromycin, spiramycin, etc. and of certain compounds such as hinokitiol, nitrofurazone, furazolidone, nitrofurylacrylic acid amide, 2-(2-furyl)-3-(5-nitro-2-furyl)acrylamide, etc. against alkalophilic acid-producing bacteria, more especially against e.g. Streptococcus faecalis, Aerobacter aerogenes and Serratia piscatorum, renders these antibiotics and/or chemical compounds effective active ingredients of compositions useful in preventing flacherie-like disease in silkworms.

---

The present application is a continuation-in-part of copending application Ser. No. 344,823, filed Feb. 14, 1964, now abandoned.

The present invention relates to a method for preventing flacherie-like disease of silkworms and to a composition therefor. As silkworms suffering from flacherie-like disease almost inevitably die, the prevention of flacherie-like disease is an important problem in rearing silkworms. Although many attempts have been made to overcome the disease, none, as far as the present inventors are aware, has—prior to this invention—been entirely successful when applied to practical use. The present inventors have, however, found that certain antibiotics and certain chemical compounds can protect silkworms against flacherie-like disease.

It is a principal object of the present invention to provide a method for the prevention of flacherie-like disease in silkworms. Another object of this invention is to provide a composition for protecting silkworms against flacherie-like disease.

Other objects and advantages will become apparent from the following description taken in conjunction with the illustrative examples.

It was observed by the present inventors that silkworms suffering from flacherie-like disease in most cases retain extremely propagated bacteria in the intestine, and these bacteria were also revealed to be alkalophilic acid-producing bacteria. They multiply in the intestine of silkworms, while producing acids, and the acids produced by the bacteria acidify the intestinal contents of the silkworms.

A variety of alkalophilic acid-producing bacteria were isolated by the present inventors from silkworms suffering from the flacherie-like disease, and it was confirmed that the isolated bacteria can cause the flacherie-like disease when healthy silkworms are infected by the bacteria.

The present inventors have also confirmed that said alkalophilic acid-producing bacteria show peculiar response to antibiotics and other chemical compounds. For instance, the growth of Gram-positive alkalophilic acid-producing bacteria cannot at all be inhibited by glumamycin, and can hardly be inhibited by tetracyclines, though these antibiotics are effective for the inhibition of the growth of other Gram-positive bacteria. Furthermore, the growth of Gram-negative alkalophilic acid-producing bacteria such as Aerobacter aerogenes, can hardly be inhibited by neomycin and zygomycin, while they are effective for the inhibition of the growth of other Gram-negative bacteria such as Serratia piscatorum. In other words, conventional antimicrobial spectra of antibiotics or other chemical compounds are not applicable to or possessed by the alkalophilic acid-producing bacteria.

The flacherie-like disease-associated alkalophilic acid-producing bacteria are distributed among a wide variety of genera, e.g. Streptococcus, Aerobacter, Serratia, Pseudomonas, Paracolobacterium, Proteus, Aeromonas, Erwinia, Flavobacterium, etc. However, from a practical and pathogenic point of view, the most dangerous alkalophilic acid-producing bacteria to silkworms are (1) those belonging to the genus Streptococcus (e.g. Streptococcus faecalis), (2) those belonging to the genus Aerobacter (e.g. Aerobacter aerogenes, Aerobacter cloacae) and (3) those belonging to the genus Serratia (e.g. Serratia piscatoroum, Serratia non-chromogenic, Serratia indica).

The following tests show the peculiar responses of three typical alkalophilic acid-producing bacteria to a variety of antibiotics and other chemical compounds. From the results, a specificity correlation is observed between the effective anti-flacherie agents, i.e. the antibiotics or other chemical compounds, and the flacherie-like disease-associated alkalophilic acid-producing bacteria, the growth of which is inhibited by said agents. The bacteria used in the followng tests are typical ones of each of the three types of the most dangerous alkalophilic acid-producing bacteria, and were isolated by the present inventors from intestinal contents of silkworms (Bombyx mori L.) suffering from flacherie-like disease.

TEST 1

The aqueous medium employed in this test for the growth of the alkalophilic acid-producing bacteria was composed of the following ingredients:

Dried extract of yeast—5 grams.
Peptone—5 grams.
Glucose—20 grams.
$KH_2PO_4$—0.5 gram.
$K_2HPO_4$—0.5 gram.
$MgSO_4 \cdot 7H_2O$—0.2 gram.
$MnSO_4 \cdot 4H_2O$—0.01 gram.
NaCl—0.01 gram.
$FeSO_4 \cdot 7H_2O$—0.01 gram.
Cow-liver autolysate—50 milliliters.
Water up to 1000 milliliters.

After the pH of the medium was adjusted to 9.7, the bacterium was inoculated and the culture medium was incubated at 28° to 30° C. for 24 to 90 hours. The efficacy of the antibiotics against the growth of the bacteria is shown in Table 1. The numbers in the table signify the concentration, in gamma per milliliter ($\gamma$/ml.), of antibiotic which was required to inhibit perfectly the growth of the bacteria. The mark "Δ" means that the growth of the bacteria was inhibited by the addition of 500 γ/ml. of the antibiotic used but not inhibited by the addition of 50 γ/ml. The mark "X" means that the growth of the bacteria was not inhibited by the addition of 500 γ/ml. of the antibiotic used.

TABLE 1

| Antibiotic | Streptococcus faecalis | Aerobacter aerogenes | Serratia piscatorum |
|---|---|---|---|
| Chlortetracycline | X | X | X |
| Oxytetracycline | X | X | X |
| Tetracycline | X | X | X |
| Dihydrostreptomycin | Δ | 0.2–0.3 | X |
| Zygomycin A₁ | X | Δ | 1.0–1.5 |
| Neomycin B | X | Δ | 0.5–1.0 |
| Kanamycin | X | Δ | 1.5–2.0 |
| Xanthomycin | X | X | Δ |
| Glumamycin | X | X | X |
| Penicillin | X | X | X |
| Hygromycin | X | X | Δ |
| Cathomycin | X | X | X |
| Carbomycin | Δ | X | X |
| Leucomycin | 2–3 | Δ | X |
| Erythromycin | 0.5–1.0 | X | X |
| Pikromycin | 0.5–1.0 | 5–10 | X |
| Pyoluteorin | X | X | X |
| Tertiomycin | 0.5–1.0 | X | X |
| Spiramycin | 0.1–0.2 | X | X |
| Tylosin | 0.5–1.0 | X | X |

TEST 2

The inhibitory effect of the chemical compounds against the growth of the bacteria is shown in the following table. The numbers in the table signify the amount (γ/ml.) of the chemical compounds which is required to inhibit the growth of the bacteria. The mark "X" means that the growth of the bacteria was not inhibited by the addition of 1000 γ/ml. of chemical compound.

| Chemical compound | Streptococcus faecalis | Aerobacter aerogenes | Serratia piscatorum |
|---|---|---|---|
| Sorbic acid | X | X | X |
| Sodium propionate | X | X | X |
| Sodium dehydroacetate | X | X | X |
| Methyl p-hydroxybenzoate | X | X | X |
| Propyl p-hydroxybenzoate | X | 100–1,000 | X |
| Butyl p-hydroxybenzoate | 100–1,000 | 100–1,000 | X |
| Hinokitiol | X | 100–1,000 | 10–100 |
| Nitrofurazone | X | 100–1,000 | 10–100 |
| Furazolidone | X | 100–1,000 | 10–100 |
| Nitrofurylacrylic acid amide | 100–1,000 | 100–1,000 | 30–50 |
| 2-(2-furyl)-3-(5-nitro-2-furyl) acrylamide | 1.0–1.5 | 0.15–0.2 | 5–10 |

As stated above, the flacherie-like disease of silkworms can be correlated with the activity of alkalophilic acid-producing bacteria, more particularly to the lowering of the pH-value of the intestinal contents due to the acids produced by the bacteria. According to the present invention and in the light of said findings and facts, the prevention of flacherie-like disease of silkworms is effectively realized by administering to the silkworms one or more of the afore-mentioned antibiotics or chemical compounds capable of exerting an inhibitory effect against the growth of alkalophilic acid-producing bacteria. The antibiotics or chemical compounds can be administered to the silkworms together with mulberry leaves or in the form of a composition admixed with artificial feed-stuff for silkworms.

The growth of alkalophilic acid-producing streptococci, e.g. Streptococcus faecalis, is strongly inhibited in silkworms by leucomycin, erythromycin, pikromycin, tertiomycin, tylosin, spiramycin and carbomycin. Dihydrostreptomycin also has the said inhibitory effect.

The growth of alkalophilic acid-producing bacteria belonging to the genus Aerobacter is inhibited strongly by dihydrostreptomycin, and also by pikromycin, leucomycin, zygomycin A₁, kanamycin and neomycin B, for example.

The growth of alkalophilic acid-producing bacteria belonging to the genus Serratia is strongly inhibited in silkworms by the application of zygomycin A₁, neomycin B and kanamycin, and also inhibited by xanthomycin and hygromycin.

Alkalophilic acid-producing bacteria other than those of said three genera (Streptococcus, Aerobacter, Serriatia) show a response similar to that of one or the other of the three genera. For example, the alkaolphilic acid-producing bacteria belonging to the genus Lactobacillus (e.g. Lactobacillus casei) show the same response to the antibiotics and the chemical compounds as the above-mentioned streptococci. The same response to the antibiotics and the chemical compounds as that of the above-mentioned Aerobacter is observed in the alkalophilic acid-producing bacteria belonging to the genus Pseudomonas (e.g. Pseudomonas aeruginosa). In the same way, the effective antibiotics and the effective chemical compounds against the Serratia are also effective against the alkalophilic acid-producing bacteria belonging to, for example, the genus Paracolobacterium, the genus Proteus (e.g. Proteus vulgaris, Proteus morganii, Proteus mirabilis), the genus Aeromonas (e.g. Aeromonas hydrophyla), the genus Erwinia (e.g. Erwinia carotovora), or the genus Flavobacterium (e.g. Flavobacterium aquatile).

The chemical compounds such as nitrofurylacrylic acid amide, 2-(2-furyl)-3-(5-nitro-2-furyl)acrylamide, hinokitiol, furazolidone, nitrofurazone, butyl para-hydroxybenzoate and propyl para-hydroxybenzoate, in general, exhibit less specificity than the antibiotics do, depending on the kind or the type of the alkalophilic acid-producing bacteria. It is noteworthy that furylacrylic acid amide and 2-(2-furyl)-3-(5-nitro-2-furyl)acrylamide inhibit the growth of any of the alkalophilic acid-producing bacteria, and especially that the latter is effective even in a very low concentration.

Effective compositions according to this invention comprise essentially at least one said effective antibiotic or chemical compound together with a suitable carrier of the type commonly employed as carriers of known artificial foodstuffs for silkworms.

In a practical sense, it is recommended to employ two or more of the antibiotics and/or the chemical compounds in combination in order most efficaciously to realize the purpose of the present invention, i.e. regardless of the particular aforesaid pathogenic alkalophilic acid-producing microorganism or microorganisms which may otherwise engender the flacherie-like disease in the silkworm. For example, when a composition comprising (1) an antibiotic or antibiotics, such as leucomycin, erythromycin, pikromycin, carbomycin, tertiomycin, spiramycin and tylosin, (2) and antibiotic or antibiotics such as zygromycin A₁, neomycin B and kanamycin, and (3) dihydrostreptomycin is fed to silkworms, a superior result in preventing the flacherie-like disease in the silkworms is attained, compared with the application of a sole or individual antibiotic.

In addition to the combination of antibiotics, a further modifictaion is possible in which a chemical compound or chemical compounds such as hinokitiol, furazolidone, nitrofurazone, butyl para-hydroxybenzoate, propyl para-hydroxybenzoate, nitrofurylacrylic acid amide or 2-(2-furyl)-3-(5-nitro-2-furyl)acrylamide, etc., is or are added to the composition. When nitrofurylacrylic acid amide or 2-(2-furyl)-3-(5-nitro-2-furyl)acrylamide, especially the latter, is used as an active component in such a composition, the antibiotics can be selected from a much wider range due to the superior and wider antimicrobial activity of the chemical compound. For instance, in such case instead of the antibiotics of said group (1), oleandomycin can be employed with substantially the same result. In the same way, xanthomycin and/or hygromycin can be used as the antibiotics of said group (2), and strepomycin may be used in lieu of dihydrostreptomycin as the antibiotic of said group (3).

The quantities of the active ingredients (antibiotics and chemical compounds) to be added to the compositions may be varied depending on various conditions such as the state of the silkworms and the kind or quantity of the other components composing the compositions. However, it is generally preferable to employ 1 to 1000 γ of the atcive ingredients per gram of the composition, or 5 to 500 γ/g when using, more especially, a single active ingredient.

Other components, one or more of which can be comprised in the present compositions, are e.g.:

Sugar, inorganic phosphate, inorganic silicate, inositol, agar-agar, sodium carboxymethyl cellulose, methyl cellulose, alginic acid, soybean powder, parched bean flour, defatted soybean powder, bean curd, dried fermented soybean powder, defatted and dried bean paste, cereal flour such as rice flour, barely flour, wheat flour, or their processed matter, yeast or its processed matter such as dry yeast, yeast extract, extracted fluid of yeast, extracted cake of yeast, straw ashes, fish meal, terpenes, β-sitosterol with or without flavonoids and cellulose powder; as stated, mulberry leaves also can effectively constitute a component of the composition.

These components can also serve the role of a carrier. Further there may be included one or more of the following nutritious components:

Animal or plant protein;
Amino acid such as glutamic acid, aspartic acid, leucine, lysine, tyrosine, tryptophane, valine, serine, proline, glycine, alanine, isoleucine, phenylalanine, arginine, methionine, threonine, or their salts;
Vitamins such as pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, lipoic acid;
Inorganic salts such as calcium carbonate, sodium carbonate, sodium hydrogen carbonate, sodium chloride;
beehive honey or its processed matter;
Pectin;
Enzyme such as diastase, papain, trypsin;
Preservative such as formalin, sodium dehydroacetate, vitamin $K_3$, sodium sorbate;
Glucuronic acid or its salt such as sodium salt, potassium salt, calcium salt, ammonium salt, organic amine salt, glucuronic acid ethyl ester, glucuronic acid amide, 2-amino-2-desoxy-D-glucuronic acid or its salt, N-glucuronoside-glucosamine or its salt; and
Any other antibiotic such, e.g. as chloramphenicol, oleandomycin, streptomycin, etc.

For the purpose of giving those skilled in the art a better understanding of the present invention, the following non-limitative illustrative examples are of presently-preferred embodiments of the compositions containing the aforesaid antibiotics or chemical compounds. In the following examples, parts are by weight.

EXAMPLE 1

A powdery composition is prepared by admixing 1 part of erythromycin, 10 parts of sucrose, 100,000 parts of yeast and 100,000 parts of wheat flour. When used as silk-worm feed, the administered composition is fed together with the four-fold part of mulberry leaves. Prevention of flacherie-like disease due to streptococci is thus realized.

EXAMPLE 2

A wettable powdery composition is prepared by admixing 1 part of dihydrostreptomycin, 1 part of oleandomycin, 3 parts of polyoxyethylene sorbitan laurate and 10 parts of bentonite. The composition is suspended in 100 parts of water and the aqueous suspension is sprayed over the ten-fold part of mulberry leaves. The latter, when fed to silkworms, is effective for the purposes of this invention.

EXAMPLE 3

A powdery composition is prepared by admixing 1 part of leucomycin, 1 part of pikromycin, 10 parts of sucrose, 100,000 parts of yeast and 100,000 parts of wheat flour. The composition is spread over the four-fold part of mulberry leaves. Silkworms feeding on such composition are effectively protected against flacherie-like disease due to streptococci or aerobacter.

EXAMPLE 4

A wettable powdery composition, effective for the purposes of this invention, is prepared by admixing 1 part of hinokitiol, 1 part of butyl para-hydroxybenzoate, 1 part of propyl para-hydroxybenzoate, 3 parts of polyoxyethylene sorbitan laurate and 100 parts of lactose. The composition is dissolved in 100 parts of water and the aqueous solution is sprayed over the ten-fold part of mulberry leaves.

EXAMPLE 5

One part of 2-(2-furyl)-3-(5-nitro-2-furyl) acrylamide is admixed with 10 parts of sucrose. One part of the mixture is dissolved in 100 parts of water. The aqueous solution is sprayed over the ten-fold part of mulberry leaves. The silkworms fed the thus-treated mulberry leaves are prevented from suffering from flacherie-like disease.

EXAMPLE 6

A powdery composition is prepared by admixing 1 part of nitrofurylacrylic acid amide, 1 part of furazolidone, 1 part of nitrofurazone and 1,000 parts of sucrose. The composition is spread over the fifteen-fold part of mulberry leaves. The product is effective against flacherie-like disease in silkworms fed therewith.

EXAMPLE 7

15 parts of spiramycin, 10 parts of dihydrostreptomycin, 30 parts of neomycin B, 200 parts of 2-(2-furyl)-3-(5-nitro-2-furyl)acrylamide and 1000 parts of sucrose, each being finely ground, are mixed together to substantial homogeneity. This composition is spread over the 1000-fold part of mulberry leaves or admixed with the 1000-fold part of an artificial feedstuff for silkworms. The silkworms fed the thus-treated mulberry leaves or feedstuff are prevented from suffering from flacherie-like disease.

In this example, the neomycin B may be replaced by 30 parts of zygomycin $A_1$ or of kanamycin to achieve substantially the same result.

EXAMPLE 8

20 parts of tertiomycin, 10 parts of dihydrostreptomycin, 30 parts of zygomycin $A_1$, 400 parts of 2-(2-furyl)-3-(5-nitro-2-furyl)acrylamide and 1000 parts of sucrose, each being finely ground, are mixed together to substantial homogeneity. This composition is spread over the 1000-fold part of mulberry leaves or admixed with the 1000-fold part of an artificial feedstuff for silkworms. The silkworms fed the thus-treated mulberry leaves or feedstuff are prevented from suffering from flacherie-like disease.

In this example, the zygomycin $A_1$ can be replaced by 30 parts of neomycin B or of kanamycin to achieve substantially the same result.

Having thus disclosed the invention what is claimed is:
1. A method for preventing flacherie-like disease in a silkworm due to infection with alkalophilic acid-producing Streptococcus which comprises feeding to the silkworms a composition comprising feedstuff for silkworms in admixture with leucomycin in a minor amount effective for said purpose.
2. A method according to claim 1, wherein the streptococcus is *Streptococcus faecalis*.
3. A method for preventing flacherie-like disease in a silkworm due to infection with alkalophilic acid-producing Aerobacter which comprises feeding to the silkworm a composition comprising feedstuff for silkworms in admixture with leucomycin in a minor amount effective for said purpose.

4. A method according to claim 3, wherein the Aerobacter is *Aerobacter aerogenes*.

5. A method according to claim 3, wherein the Aerobacter is *Aerobacter cloacae*.

References Cited

FOREIGN PATENTS 3,819,999  9/1963  Japan.

OTHER REFERENCES

Iwata, Kazuo et al., "Studies of The in Vitro Antibacterial Activity of Leucomycin" J. Antibiotics, vol. 15A, No. 6 November 1962 pp. 258–261.

ALBERT T. MEYERS, Primary Examiner

V. D. TURNER, Assistant Examiner